(12) United States Patent
Nishi

(10) Patent No.: US 6,882,444 B1
(45) Date of Patent: Apr. 19, 2005

(54) IMAGE DRAWING APPARATUS, IMAGE DRAWING METHOD, AND COMPUTER-READABLE RECORDING MEDIUM RECORDED WITH PROGRAM FOR MAKING COMPUTER EXECUTE IMAGE DRAWING METHOD

(75) Inventor: Hidefumi Nishi, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/421,006

(22) Filed: Oct. 20, 1999

(30) Foreign Application Priority Data

Apr. 30, 1999 (JP) .......................................... 11-125045

(51) Int. Cl.$^7$ .......................... G06F 15/00; G06K 1/00
(52) U.S. Cl. .................. 358/1.9; 345/611; 345/592; 345/589; 358/3.27; 358/464; 382/269; 382/266
(58) Field of Search ............................... 358/1.9, 3.26, 358/3.27, 448, 462, 464; 382/269, 254, 266; 345/611, 592, 589

(56) References Cited

U.S. PATENT DOCUMENTS

| | | | |
|---|---|---|---|
| 4,843,380 A | * 6/1989 | Oakley et al. | 345/615 |
| 5,351,315 A | * 9/1994 | Ueda et al. | 382/266 |
| 5,487,142 A | 1/1996 | Nakayama et al. | 395/143 |
| 5,502,795 A | * 3/1996 | Shirouzu | 358/1.9 |
| 5,684,941 A | * 11/1997 | Dye | 345/441 |
| 5,818,456 A | * 10/1998 | Cosman et al. | 345/614 |
| 5,872,902 A | * 2/1999 | Kuchkuda et al. | 345/615 |
| 5,903,276 A | * 5/1999 | Shiraishi | 345/600 |
| 5,943,060 A | * 8/1999 | Cosman et al. | 345/613 |
| 5,977,987 A | * 11/1999 | Duluk, Jr. | 345/441 |
| 6,034,700 A | * 3/2000 | Rumph et al. | 345/441 |
| 6,052,131 A | 4/2000 | Oka | 345/441 |
| 6,480,201 B1 | * 11/2002 | Fushiki et al. | 345/592 |
| 6,486,888 B1 | * 11/2002 | Fushiki et al. | 345/592 |
| 2001/0055024 A1 | * 12/2001 | Funakubo et al. | 345/589 |

FOREIGN PATENT DOCUMENTS

| | | | | |
|---|---|---|---|---|
| JP | 08-249479 | * | 9/1996 | G06T/11/00 |
| JP | 9-259290 | | 10/1997 | G06T/11/00 |
| JP | 10334250 | * | 12/1998 | G06T/11/20 |

OTHER PUBLICATIONS

Prof. Dr. Ing. Jose Encarnacao et al., "Graphic Data Processing 1", Chapter 2.5: *Raster Algorithms 4th Edition*, Oldenbourg Munich, 1996, ISBN 3–486–233223–1, pp. 70–86.

* cited by examiner

*Primary Examiner*—Kimberly Williams
*Assistant Examiner*—Melanie Vida
(74) *Attorney, Agent, or Firm*—Staas & Halsey LLP

(57) ABSTRACT

In the image drawing apparatus, a drawing position last time is stored in advance in a drawing position memory section, and a linear complementing processing section specifies pixels to be complemented from the last drawing position stored in the drawing position memory section and a drawing this time, and calculates semi-transparent rates of the pixels specified. A semi-transparency processing section then calculates pixel values of the pixels to be complemented by using the calculated semi-transparent rates. Therefore, anti-aliasing processing can be carried out at a high speed.

6 Claims, 11 Drawing Sheets

FIG.8A  PIXELS TO BE ANTI-ALIASING PROCESSED

IMAGE DRAWING APPARATUS, IMAGE DRAWING METHOD, AND COMPUTER-READABLE RECORDING MEDIUM RECORDED WITH PROGRAM FOR MAKING COMPUTER EXECUTE IMAGE DRAWING METHOD

FIELD OF THE INVENTION

The present invention relates to an image drawing apparatus, an image drawing method and a recording medium, for complementing with an intermediate color an aliasing generated at the time of making a display output or a print output (hereinafter to be referred to as an output) of image data of a polygon, while storing this image data in an image memory. More particularly, this invention relates to an image drawing apparatus, an image drawing method, and a recording medium, capable of carrying out, at high speed and in a small memory capacity, an anti-aliasing processing for making look smooth a stage-shaped boundary in pixel units appearing on each side of the polygonal shape.

BACKGROUND OF THE INVENTION

There has been known an image drawing apparatus employing an anti-aliasing technique for removing an aliasing which appears as a stage-shaped portion at the boundary of a polygon when this polygon is displayed on a display apparatus or a screen. This anti-aliasing technique is a technique for providing an intermediate color to a boundary portion of a drawing thereby to make a luminance difference at the boundary portion not easily noticeable.

As representative anti-aliasing techniques conventionally available, there are an over-sampling method, an area rate method and a two-time drawing method. The over-sampling method is a technique in which a polygon is drawn in an image space larger than display pixels, and a plurality of pixels are combined to form in one display pixel in compression at the time of a display.

The area rate method is a technique of calculating a linear line forming each side of a polygon in units smaller than pixels, calculating a rate of an area primarily occupied by the polygon in boundary pixels, and carrying out a semi-transparent processing in pixels already drawn according to the rate calculated.

The two-time drawing method is a technique of drawing a linear line based on an aliasing processing along each side of a polygon separate from a drawing of the polygon, by using a linear line drawing apparatus for carrying out an anti-aliasing processing.

According to the prior-art anti-aliasing technique, however, there are problems that a large memory capacity is required and that a drawing processing is delayed. In other words, when the over-sampling method is used, it is necessary to hold a larger memory area in the drawing space than a memory area primarily required for the display. Further, the load of processing increases by the portion of the drawing area expanded, which results in a processing delay.

When the area rate method is used, it is necessary to calculate an area for each pixel forming a boundary portion, and therefore, it takes time for a drawing processing.

Further, when the two-time drawing method is used, it is necessary to carry out a linear line drawing processing independent of a polygonal drawing processing, in addition to the polygonal drawing processing primarily required. Therefore, it is not possible to make the most of a general advantage of a memory that a processing can be executed at a higher speed in a near memory area. As a result, a processing delay is generated.

As explained above, according to the prior-art anti-aliasing processing, there are severe problems from the viewpoint of memory capacity and processing delay. Therefore, it has been an extremely important subject to find out how to achieve at high speed and in a small memory capacity, the anti-aliasing processing for making look smooth a stage-shaped boundary in pixel unit appearing on each side of a polygon.

SUMMARY OF THE INVENTION

The present invention has been made in the light of the above problems. It is an object of the invention to provide an image drawing apparatus, an image drawing method, and a recording medium, capable of carrying out, at high speed and in a small memory capacity, an anti-aliasing processing for making look smooth a stage-shaped boundary in pixel unit appearing on each side of the polygonal shape.

In order to achieve the above object of the invention, according to one of the aspects of the invention, there is provided an image drawing apparatus, in which, in storing image information of pixels forming a part of a polygon in an image memory, a linear complementing processing unit specifies a pixel string of which aliasing is to be complemented, based on a difference between pixel positions of the pixels and pixel positions of pixels stored last time in the image memory, and calculates a semi-transparent rate of each pixel forming the pixel string, based on the number of pixels of the specified pixel string. Further, a semi-transparency processing unit carries out a semi-transparent processing of the pixel string to be complemented, based on the semi-transparent rate calculated by the linear complementing processing unit. Therefore, at the time of drawing the polygon in the image memory, it is possible to carry out an anti-aliasing processing at high speed without requiring a work memory area other than the drawing memory.

Further, the image drawing apparatus relating to the present invention may also be arranged such that a slope calculating unit calculates a slope of a side of a polygon, and specifies a pixel string to be complemented by converting a pixel position into a column direction and a pixel position into a row direction, when the calculated slope exceeds 45 degrees. With this arrangement, it is possible to efficiently carry out an anti-aliasing processing in any case of when the slope is less than 45 degrees or when the slope exceeds 45 degrees.

Further, the image drawing apparatus relating to the present invention may also be arranged such that a number of pixels existing between a pixel position of a first pixel stored last time in the image memory and a pixel position of a second pixel currently stored in the image memory is calculated, and the pixel string of the corresponding number of pixels adjacent to the first pixel is set as a pixel string to be complemented. With this arrangement, it is possible to efficiently specify a pixel string to be complemented.

Further, the image drawing apparatus relating to the present invention may also be arranged such that a semi-transparent rate of each pixel forming a specified pixel string is increased linearly. With this arrangement, it is possible to promptly allocate a semi-transparent rate to a pixel forming the pixel string to be complemented.

Further, the image drawing apparatus relating to the present invention may also be arranged such that a reference value (a complement value difference) of a semi-transparent rate is calculated based on the number of pixels of a specified pixel string, this reference value is added in circulation by a counter, a semi-transparent rate output unit and an adder respectively, and this added value is used as a semi-transparent rate of each pixel forming the pixel string. With this arrangement, it is possible to calculate a semi-transparent rate easily by using a circulating circuit.

According to one of the aspects of the invention, there is provided an image drawing apparatus, in which a calculating unit calculates a slope of a side of a polygon, two decimal fraction units, a selector and a subtractor respectively calculate a semi-transparent rate of a pixel, based on a coordinate position of the pixel to be complemented calculated from the calculated slope. Further, a semi-transparency processing unit carries out a semi-transparent processing of the pixel to be complemented, based on the calculated semi-transparent rate. With this arrangement, it is possible to carry out a semi-transparent processing at high speed, by only an extremely simple calculation using a decimal fraction part of the coordinates.

Further, the image drawing apparatus relating to the present invention may also be arranged such that when a calculated slope is less than 45 degrees, a semi-transparent rate is calculated based on a decimal fraction part of a pixel position in a column direction, and when a calculated slope exceeds 45 degrees, a semi-transparent rate is calculated based on a decimal fraction part of a pixel position in a row direction. With this arrangement, it is possible to efficiently carry out an anti-aliasing processing in any case whether when the slope is less than 45 degrees or when the slope exceeds 45 degrees.

Further, the image drawing apparatus relating to the present invention may also be arranged such that a value obtained by subtracting from 1, a decimal fraction part of a coordinate position of a pixel to be complemented calculated from the calculated slope, is used as a semi-transparent rate. With this arrangement, it is possible to calculate at high speed a semi-transparent rate by a mere calculation of a subtraction.

The image drawing apparatus relating to the present invention may also be arranged such that two decimal fraction units extract decimal fraction parts at the column-direction and row-direction coordinate positions of the pixels to be complemented respectively, a selector selects any one decimal fraction part extracted based on a calculated slope, and a subtractor subtracts from 1 the selected decimal fraction part. With this arrangement, it is possible to calculate a semi-transparent rate by an extremely simple calculation of subtracting any one of row and column decimal fraction parts from 1.

According to one of the aspects of the invention, there is provided an image drawing apparatus, in which a calculating unit calculates a slope of a side of a polygon; in storing image information of pixels forming a part of a polygon in an image memory, a linear complementing processing unit specifies a pixel string of which aliasing is to be complemented, based on a difference between pixel positions of the pixels and pixel positions of pixels stored last time in the image memory, and calculates a semi-transparent rate of each pixel forming the pixel string, based on the number of pixels of the specified pixel string; or a decimal fraction unit and a subtractor calculate a semi-transparent rate of the pixel based on a coordinate position of the pixel to be complemented from the slope calculated by a slope calculating unit; and thus a semi-transparent rate is obtained; and a semi-transparency processing unit carries out a semi-transparent processing of each pixel to be complemented, based on the semi-transparent rate obtained by any one of the above methods. Accordingly, it is possible to efficiently carry out the anti-aliasing by using an optimum method of the two kinds of a semi-transparent rate calculating unit.

Further, the image drawing apparatus relating to the present invention may also be arranged such that when a calculated slope is less than 45 degrees, a semi-transparent rate is set by the former semi-transparent rate calculating unit, and when a calculated slope exceeds 45 degrees, a semi-transparent rate is set by the latter semi-transparent rate calculating unit. With this arrangement, it is possible to calculate a semi-transparent rate by using the more suitable semi-transparent rate calculating unit depending on whether the slope of a side is less than 45 degrees or the slope of the side exceeds 45 degrees.

Further, in the image drawing apparatus relating to the present invention, a value obtained by multiplying image information of a pixel forming a polygon with the semi-transparent rate and a value obtained by multiplying a value after having the semi-transparent rate subtracted from 1 (1—the semi-transparent rate) with image information of a pixel forming a background other than the polygon, are added together, and this added value is used as image information of each pixel forming the pixel string. Accordingly, it is possible to efficiently carry out a semi-transparent processing by simple calculation.

Further, in the image drawing apparatus relating to the present invention, there may be arranged such that when a slope calculated by an ON/OFF unit is not 45 degrees, a semi-transparent processing becomes possible, and when the slope is 45 degrees, a semi-transparent processing is not possible. With this arrangement, it is possible to avoid a processing when an aliasing is not generated, so that the speed of processing can be increased further.

According to one of the aspects of the invention, there is provided an image drawing method, in which, in storing image information of pixels forming a part of a polygon in an image memory, a pixel string of which aliasing is to be complemented is specified, based on a difference between pixel positions of the pixels and pixel positions of pixels stored last time in the image memory, a semi-transparent rate of each pixel forming the pixel string is calculated, based on the number of pixels of the specified pixel string, and a semi-transparent processing of the pixel string to be complemented is carried out, based on the calculated semi-transparent rate. Therefore, at the time of drawing the polygon in the image memory, it is possible to carry out an anti-aliasing processing at high speed without requiring a work memory area other than the drawing memory.

Further, the image drawing method relating to the present invention may also be arranged such that the slope of a side of a polygon is calculated, and, when the calculated slope exceeds 45 degrees, a pixel string to be complemented is specified by replacing a pixel position in a column direction with a pixel position in a row direction. With this arrangement, it is possible to efficiently carry out an anti-aliasing processing in any case of when the slope is less than 45 degrees or when the slope exceeds 45 degrees.

Further, the image drawing method relating to the present invention may also be arranged such that a number of pixels existing between a pixel position of a first pixel stored last time in the image memory and a pixel position of a second pixel currently stored in the image memory is calculated, and the pixel string of the corresponding number of pixels adjacent to the first pixel is set as a pixel string to be complemented. With this arrangement, it is possible to efficiently specify a pixel string to be complemented.

Further, the image drawing method relating to the present invention may also be arranged such that a semi-transparent rate of each pixel forming a specified pixel string is increased linearly. With this arrangement, it is possible to promptly allocate a semi-transparent rate to a pixel forming the pixel string to be complemented.

Further, the image drawing method relating to the present invention may also be arranged such that a reference value (a complement value difference) of a semi-transparent rate is calculated based on the number of pixels of a specified pixel string, this reference value is added in circulation and this added value is used as a semi-transparent rate of each pixel forming the pixel string. With this arrangement, it is possible to calculate a semi-transparent rate easily by using a circulating circuit.

According to one of the aspects of the invention, there is provided an image drawing method, in which a slope of a side of a polygon is calculated, the semi-transparent rate of a pixel is calculated, based on a coordinate position of the pixel to be complemented calculated from the calculated slope, and a semi-transparent processing is carried out for the pixel to be complemented, based on the calculated semi-transparent rate. With this arrangement, it is possible to carry out a semi-transparent processing at high speed, by only an extremely simple calculation using a decimal fraction part of the coordinates.

Further, the image drawing method relating to the present invention may also be arranged such that when a calculated slope is less than 45 degrees, a semi-transparent rate is calculated based on a decimal fraction part of a pixel position in a column direction, and when a calculated slope exceeds 45 degrees, a semi-transparent rate is calculated based on a decimal fraction part of a pixel position in a row direction. With this arrangement, it is possible to efficiently carry out an anti-aliasing processing in any case whether when the slope is less than 45 degrees or when the slope exceeds 45 degrees.

Further, the image drawing method relating to the present invention may also be arranged such that a value obtained by subtracting from 1, a decimal fraction part of a coordinate position of a pixel to be complemented calculated from the calculated slope, is used as a semi-transparent rate. With this arrangement, it is possible to calculate at high speed a semi-transparent rate by a mere calculation of a subtraction.

Further, the image drawing method relating to the present invention may also be arranged such that decimal fraction parts at the column-direction and row-direction coordinate positions of the pixels to be complemented respectively are extracted, any one decimal fraction part extracted based on a calculated slope is selected, and the selected decimal fraction part is subtracted from 1. With this arrangement, it is possible to calculate a semi-transparent rate by an extremely simple calculation of subtracting any one of row and column decimal fraction parts from 1.

According to one of the aspects of the invention, there is provided an image drawing method, in which a slope of a side of a polygon is calculated; in storing image information of pixels forming a part of a polygon in an image memory, a pixel string of which aliasing is to be complemented is specified, based on a difference between pixel positions of the pixels and pixel positions of pixels stored last time in the image memory, and a semi-transparent rate of each pixel forming the pixel string is calculated, based on the number of pixels of the specified pixel string; or the semi-transparent rate of the pixel is calculated based on a coordinate position of the pixel to be complemented from the calculated slope; and thus a semi-transparent rate is obtained; and a semi-transparent processing is carried out for each pixel to be complemented, based on the semi-transparent rate obtained by any one of the above methods. Accordingly, it is possible to carry out a calculation of a semi-transparent rate by using one of the suitable unit for calculating a semi-transparent rate based on whether the slope of a side is less than 45 degrees or the slope exceeds 45 degrees.

Further, in the image drawing method relating to the present invention, there may be arranged such that a value obtained by multiplying image information of a pixel forming a polygon with the semi-transparent rate and a value obtained by multiplying a value after having the semi-transparent rate subtracted from 1 (1—the semi-transparent rate) with image information of a pixel forming a background other than the polygon, are added together, and this added value is used as image information of each pixel forming the pixel string. With this arrangement, it is possible to efficiently carry out a semi-transparent processing by simple calculation.

Further, in the image drawing method relating to the present invention, there may be arranged such that when the calculated slope is not 45 degrees, a semi-transparent processing becomes possible, and when the slope is 45 degrees, a semi-transparent processing is not possible. With this arrangement, it is possible to avoid a processing when an aliasing is not generated, so that the speed of processing can be increased further.

According to one of the aspects of the invention, there is provided a recording medium, in which, in storing image information of pixels forming a part of a polygon in an image memory, a pixel string of which aliasing is to be complemented is specified, based on a difference between pixel positions of the pixels and pixel positions of pixels stored last time in the image memory, a semi-transparent rate of each pixel forming the pixel string is calculated, based on the number of pixels of the specified pixel string, and a semi-transparent processing of the pixel string to be complemented is carried out, based on the calculated semi-transparent rate. Therefore, at the time of drawing the polygon in the image memory, it is possible to achieve by computer an operation of carrying out an anti-aliasing processing at high speed without requiring a work memory area other than the drawing memory.

According to one of the aspects of the invention, there is provided a recording medium, in which a slope of a side of a polygon is calculated, the semi-transparent rate of a pixel is calculated, based on a coordinate position of the pixel to be complemented calculated from the calculated slope, and a semi-transparent processing is carried out for the pixel to be complemented, based on the calculated semi-transparent rate. With this arrangement, it is possible to achieve by computer an operation of carrying out a semi-transparent processing at high speed, by only an extremely simple calculation using a decimal fraction part of the coordinates.

According to one of the aspects of the invention, there is provided a recording medium, in which a slope of a side of a polygon is calculated; in storing image information of pixels forming a part of a polygon in an image memory, a pixel string of which aliasing is to be complemented is specified, based on a difference between pixel positions of the pixels and pixel positions of pixels stored last time in the image memory, and a semi-transparent rate of each pixel forming the pixel string is calculated, based on the number of pixels of the specified pixel string; or the semi-transparent rate of a pixel is calculated based on a coordinate position of the pixel to be complemented from the calculated slope; and thus a semi-transparent rate is obtained; and a semi-transparent processing is carried out for each pixel to be complemented, based on the semi-transparent rate obtained by any one of the above methods. Accordingly, it is possible to achieve by computer an operation of carrying out a calculation of a semi-transparent rate by using one of the suitable methods for calculating a semi-transparent rate based on whether the slope of a side is less than 45 degrees or the slope exceeds 45 degrees.

Other objects and features of this invention will become apparent from the following description with reference to the accompanying drawings.

BRIEF DESCRIPTION OF THE DRAWINGS

FIG. 8A and FIG. 8B are explanatory views for showing the concept of a method of using a decimal fraction part of drawing coordinates used in the second embodiment;

DESCRIPTION OF THE PREFERRED EMBODIMENTS

Figure 1A:
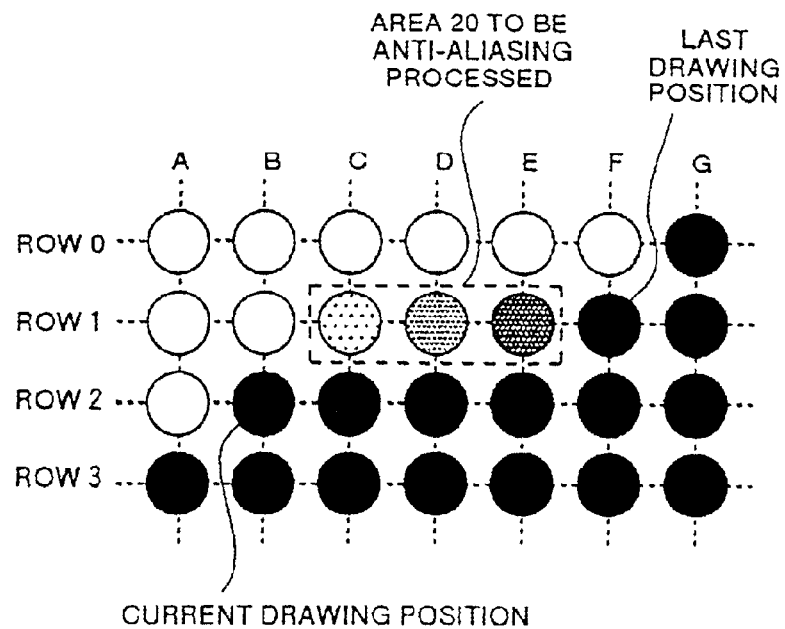
FIG. 1A and FIG. 1B are explanatory views for showing the concept of a method of linearly complementing a difference between drawing positions used in the first embodiment.

With reference to the attached drawings, there will be explained in detail below, preferred embodiments of the present invention, including an image drawing apparatus, an image drawing method, and a computer-readable recording medium recorded with a program for making a computer execute this method. In the following, a method of linearly complementing a difference between drawing positions will be explained in the first embodiment, a method of utilizing drawing-coordinate decimal fraction parts will be explained in the second embodiment, and a combined method of these two methods will be explained in the third embodiment, each method relating to the present invention.

At first, the concept of a method of linearly complementing a difference between drawing positions to be used in the first embodiment will be explained. The method of linearly complementing a difference between drawing positions is a method which includes the steps of storing a drawing position immediately before the drawing of a current drawing position, specifying an area to be processed from a relationship between the stored drawing position drawn immediately before and the current drawing position, and thus implementing an anti-aliasing processing to pixels included in the specified area, thereby to complement pixel values.

Figure 1B:
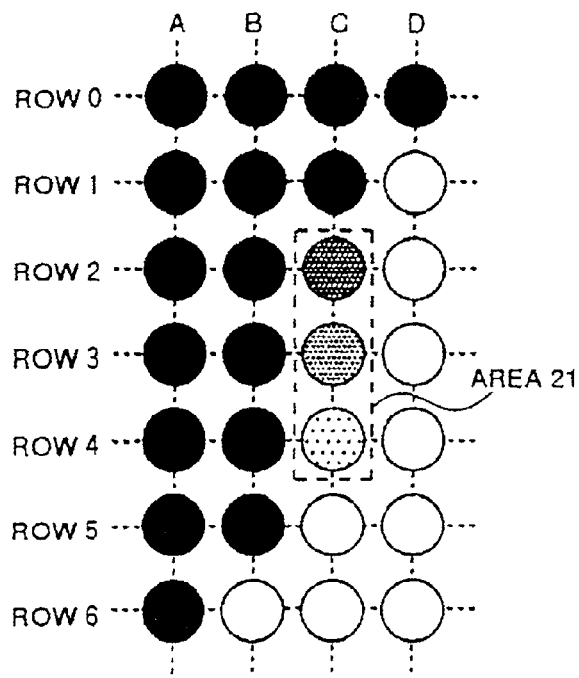

FIG. 1A and FIG. 1B are explanatory views for showing the concept of the method of linearly complementing a difference between drawing positions used in the first embodiment. In the drawing, reference numerals 0 to 6 denote row numbers, A to G denote column numbers, and pixels shown in black circles denote pixels that form a part of a polygon. In this explanation, the polygon is divided into row units, and a drawing is carried out for each row.

As shown in FIG. 1A, it is assumed that a pre-stored drawing position drawn immediately before, that is, drawn last time, is a pixel at a position of row 1 and column F (hereinafter to be expressed as (F, 1)), and a current drawing position is a pixel of (B, 2). Then, pixels (C, 1), (D, 1) and (E, 1) included in an area 20 encircled by a broken line in the drawing becomes pixels to which an anti-aliasing processing is to be carried out.

At first, by using pixel values of pixels already drawn positioned on both sides of the area 20, a rate of semi-transparency processing (a semi-transparent rate) of each of the pixels (C, 1), (D, 1) and (E, 1) included in the area 20 is determined.

More specifically, in the case of FIG. 1A, it is assumed that a semi-transparent rate of the pixel (F, 1) positioned at the right side of the area 20 is 100%, and a semi-transparent rate of the pixel (B, 1) at the left side of the area 20 is 0%. Then, semi-transparent rates of the pixels positioned between these two pixels are changed in a constant proportion. As a result, a semi-transparent rate of the pixel (C, 1) becomes 25%, a semi-transparent rate of the pixel (D, 1) becomes 50%, and a semi-transparent rate of the pixel (E, 1) becomes 75%. A semi-transparent rate 100% means that there is no transparency. For example, a black pixel corresponds to 100% semi-transparent rate when the background is a white monochromatic image. On the other hand, a semi-transparent rate 0% means that there is a complete transparency, and the background color itself appears. For example, a white pixel corresponds to 0% when the background is a white monochromatic image.

In this semi-transparent processing, a pixel string (C, 2) to (E, 2) positioned at the next row of the area 20 is assumed as a drawing origin, and the pixel string (C, 1) to (E, 1) included in the area 20 is assumed as a drawing destination. Then, a semi-transparent processing is carried out between the pixels of the drawing origin and the pixels of the drawing destination, and a result of the semi-transparent processing is drawn in the pixels of the drawing destination. For example, for the pixel (C, 1), a semi-transparent processing is carried out between the pixel (C, 2) of the drawing origin and the pixel (C, 1) of the drawing destination, and a result of this processing is drawn in the pixel (C, 1).

As explained above, when a polygon is divided into rows and a drawing is carried out in each row, it is possible to apply the above processing when the slope of a side of the polygon is less than 45 degrees, as shown in FIG. 1A. However, when the slope of a side of the polygon exceeds 45 degrees, as shown in FIG. 1B, it is not possible to specify an area 21 in a similar step. To avoid this problem, in this case, the relationship between the rows and columns is replaced, and the above-described processing is carried out. In the following explanation, it is assumed that a slope is 45 degrees when there occurs no aliasing corresponding to x=y or x=−y on an xy plane. In this case, it is assumed that x=0 and y=0 are also included.

As explained above, the method of linearly complementing a difference between drawing positions according to the first embodiment includes the steps of storing a drawing position immediately before the drawing of a current drawing position, specifying an area to be processed from a relationship between the stored drawing position drawn immediately before and the current drawing position, and thus implementing an anti-aliasing processing to pixels included in the specified area, thereby to complement pixel values.

Next, there will be explained below a structure of the image drawing apparatus using the method of linearly complementing a difference between drawing positions relating to the first embodiment. In this case, it is assumed that a drawing is carried out into pixels for each row, and pixels of one row before are anti-aliasing processed.

Figure 2:
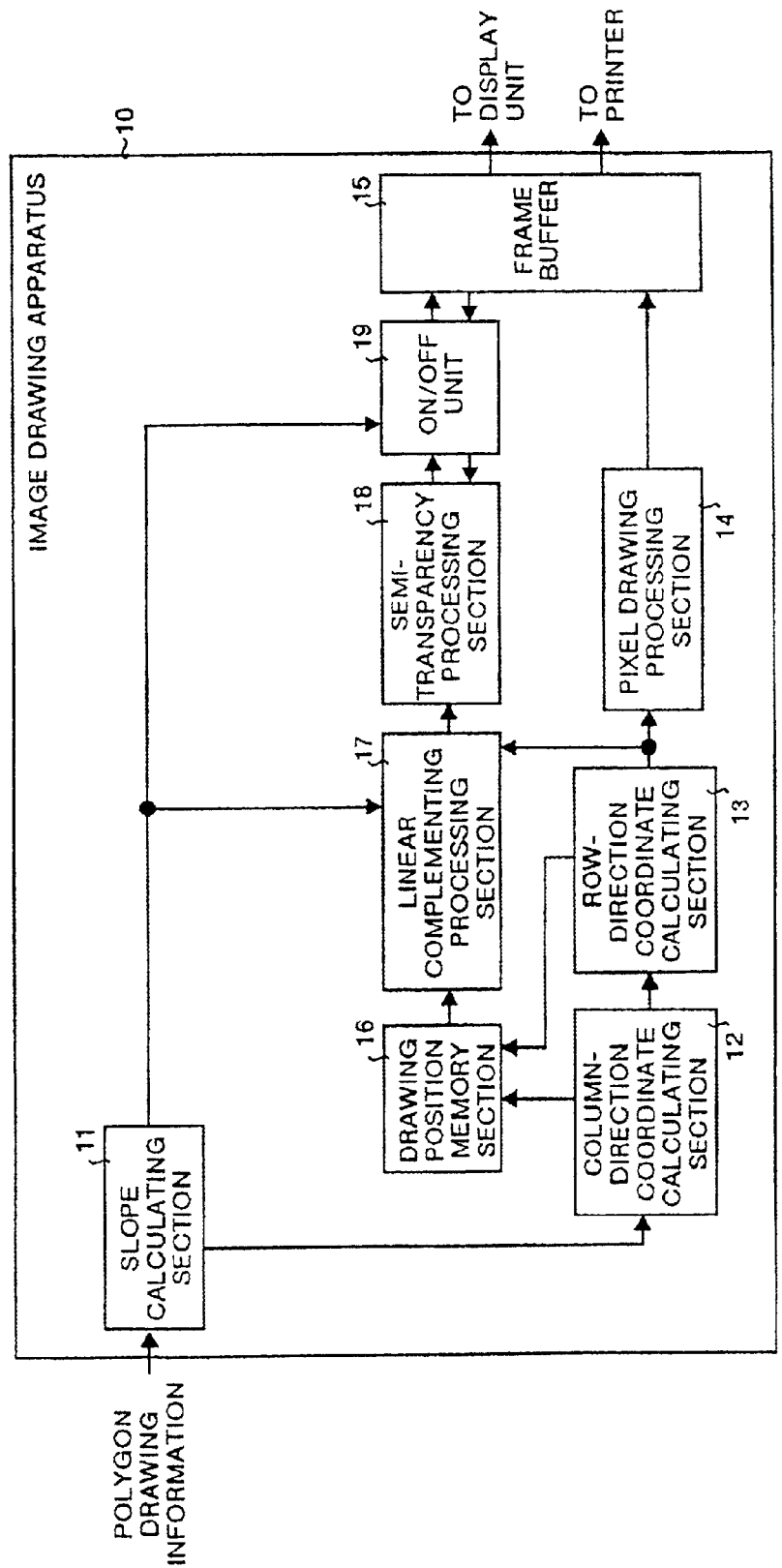
FIG. 2 is a block diagram for showing a structure of an image drawing apparatus using the method of linearly complementing the difference between drawing positions relating to the first embodiment.

FIG. 2 is a block diagram for showing a structure of an image drawing apparatus using the method of linearly complementing a difference between drawing positions relating to the first embodiment. In FIG. 2, an image drawing apparatus has a slope calculating section 11, a column-direction coordinate calculating section 12, a row-direction coordinate calculating section 13, a pixel drawing processing section 14, a frame buffer 15, a drawing position memory section 16, a linear complementing processing section 17, a semi-transparency processing section 18, and an ON/OFF unit 19.

The slope calculating section 11 is a processing section for calculating a slope of a side of a polygon, and this section outputs a calculated slope to the linear complementing processing section 17 and the ON/OFF unit 19. The calculated slope is output to the linear complementing processing section 17 for the linear complementing processing section 17 to carry out a replacement between the rows and the columns depending on whether the slope is less than 45 degrees or not. The calculated slope is output to the ON/OFF unit 19 to turn off this ON/OFF unit 19 so as not to carry out the anti-aliasing processing itself when the slope is 45 degrees.

The column-direction coordinate calculating section 12 is a processing section for calculating a column-direction coordinate position to be drawn on the frame buffer 15, and the row-direction coordinate calculating section 13 is a processing section for calculating a row-direction coordinate position to be drawn on the frame buffer 15.

The pixel drawing processing section 14 is a processing section for providing a pixel value to a coordinates position on the frame buffer 15 indicated by a column coordinate calculated by the column-direction coordinate calculating section 12 and a row coordinate calculated by the row-direction coordinate calculating section 13, and for drawing an image. The frame buffer 15 is a two-dimensional memory for storing image data of a polygon. For example, a dynamic RAM (random access memory) can be used for this frame buffer 15. The dynamic RAM has best efficiency of processing in a continuous area, and therefore, is used to draw an image of a polygon in rows by dividing the polygon in row units, taking the advantage of the characteristics of the dynamic RAM.

The drawing position memory section 16 is a memory section for storing a column-direction coordinate and a row-direction coordinate of a drawing position drawn immediately before, that is, drawn last time. The row-direction coordinate is stored for the purpose of replacing the row-direction coordinate with the column-direction coordinate when a slope calculated by the slope calculating section 11 is less than 45 degrees.

The linear complementing processing section 17 is a processing section relating to the present invention, for carrying out a linear complementing processing of a difference between drawing positions. More specifically, the linear complementing processing section 17 obtains a drawing positional difference between a drawing position last time and a drawing position this time, specifies an area to be processed based on the drawing positional difference obtained, and obtains a semi-transparent rate, or a transmission rate, of pixels existing in the specified area to be processed.

The semi-transparency processing section 18 is a processing section for carrying out a semi-transparent processing between pixels existing in the area to be processed (pixels of a drawing destination) and pixels of a drawing origin, based on the semi-transparent rate calculated by the linear complementing processing section 17.

The ON/OFF unit 19 is a switch unit for changing over whether or not to carry out a semi-transparent processing based on a slope calculated by the slope calculating section 11. More specifically, when a slope calculated by the slope calculating section 11 is 45 degrees, a staged aliasing is not generated by nature. Therefore, in this case, the ON/OFF unit 19 is turned off so that an anti-aliasing processing is not carried out. On the other hand, when the slope is other than 45 degrees, an aliasing occurs, and therefore, the ON/OFF unit 19 is turned on to carry out an anti-aliasing processing.

By using the image drawing apparatus 10 having the above-described structure, it is possible to draw an image on the frame buffer 15 while carrying out an anti-aliasing processing using the method of linearly complementing a difference between drawing positions. Image data of the image drawn on the frame buffer 15 is output to a display unit or a printing unit by a display controller or a print controller respectively not shown.

According to this image drawing apparatus 10, when drawing information of a polygon is input, the slope calculating section 11 calculates a slope, and then the column-direction coordinate calculating section 12 and the row-direction coordinate calculating section 13 calculate a column-direction coordinate and a row-direction coordinate respectively, and the image drawing processing section 14 stores pixel values in a corresponding coordinates position of the frame buffer 15.

In this case, as the last drawing position is being stored in the drawing position memory section 16, the linear complementing processing section 17 calculates a semi-transparent rate by using the last drawing position and a drawing position this time, and the semi-transparency processing section 18 carries out a semi-transparent processing by using the calculated semi-transparent rate. As pixel values of pixels of the drawing destination and pixels of the drawing origin are necessary for the semi-transparency processing section 18 to carry out a semi-transparent processing, the necessary pixel values are taken in from the frame buffer 15.

Figure 3:
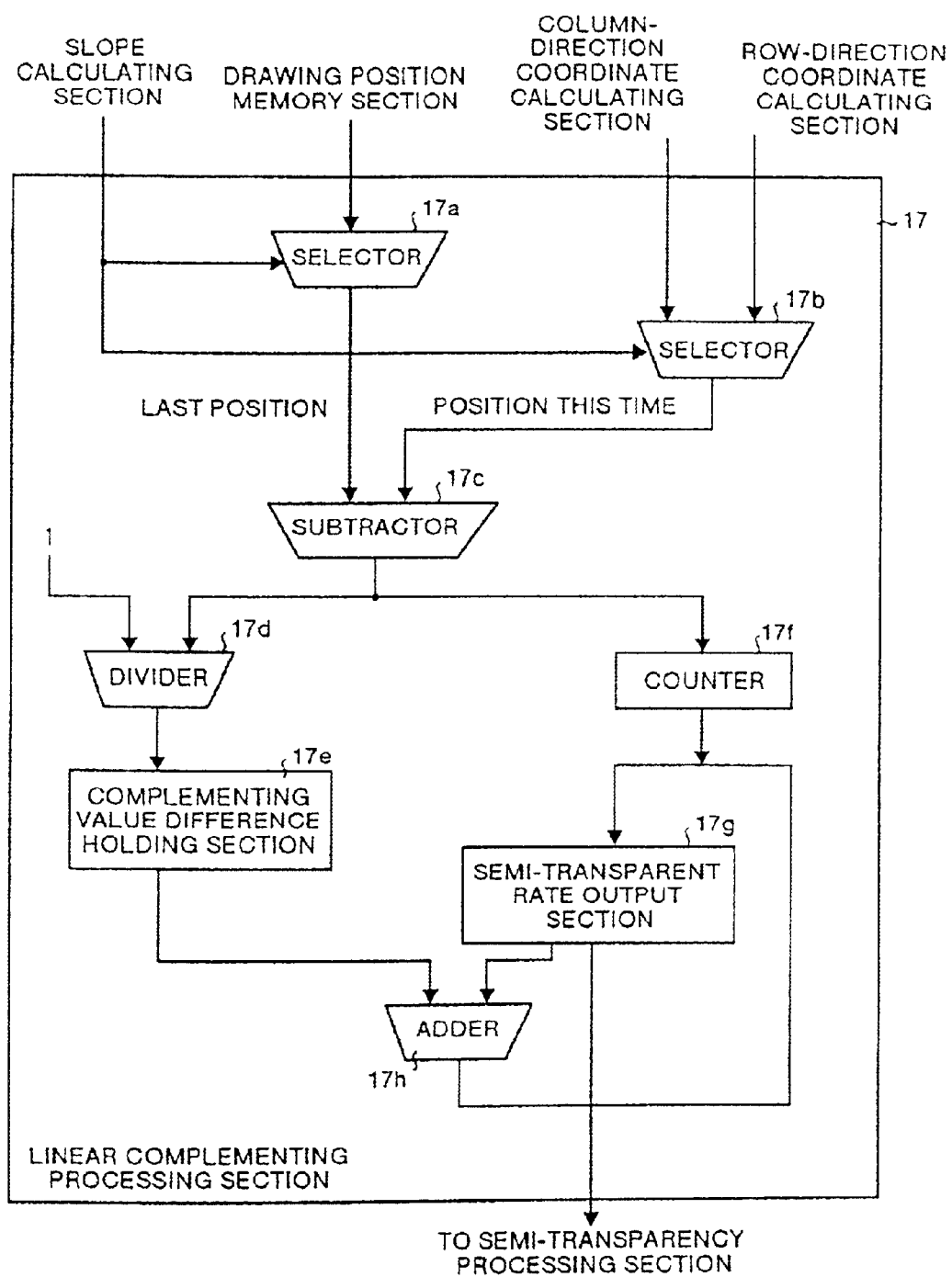
FIG. 3 is an explanatory diagram for showing a detailed structure of a linear complementing processing section shown in FIG. 2.

A detailed structure of the linear complementing processing section 17 shown in FIG. 2 is explained here. FIG. 3 is a diagram for showing a detailed structure of the linear complementing processing section 17 shown in FIG. 2. As shown in FIG. 3, the linear complementing processing section 17 has selectors 17a and 17b, a subtractor 17c, a divider 17d, a complementing-value difference holding section 17e, a counter 17f, a semi-transparent rate output section 17g and an adder 17h.

In the linear complementing processing section 17, the selectors 17a and 17b select a last position and a position this time, based on a slope calculated by the slope calculating section 11. More specifically, when an angle calculated by the slope calculating section 11 is less than 45 degrees, the selector 17a selects a column-direction coordinate stored in the drawing position memory section 16 as a column-direction coordinate at the last position. When an angle calculated by the slope calculating section 11 exceeds 45 degrees, the selector 17a selects a row-direction coordinate stored in the drawing position memory section 16 as a column-direction coordinate at the last position.

When a slope calculated by the slope calculating section 11 is less than 45 degrees, the selector 17b selects a column-direction coordinate calculated by the column-direction coordinate calculating section 12 as a column-direction coordinate this time. When a slope calculated by the slope calculating section 11 exceeds 45 degrees, the selector 17b selects a row-direction coordinate calculated by the row-direction coordinate calculating section 13 as a column-direction coordinate this time.

Thereafter, the subtractor 17c obtains a difference between the column-direction coordinate at the last position and the column-direction coordinate this time, and obtains a number of pixels that are to be anti-aliasing processed. In this case, as the last position reference is known, it is possible to specify the pixels to be processed, when the number of pixels to be processed is calculated. The reason why a differential value of the row-direction coordinate is not obtained is that, in this case, the pixel drawing processing section 14 is going to carry out an anti-aliasing processing with a delay of one row from the row where a drawing is to be carried out in pixels.

Specifically, in the case of FIG. 1A, there remain four pixels when the column-direction coordinate of the position this time is subtracted from the column-direction coordinate at the last position. Although the calculated number of pixels to be processed is four in this case, there are actually three pixels (C, 1) to (E, 1) to be practically processed, as described above, as the semi-transparent rate of the first pixel is 0% in the processing to be described later.

Then, the divider 17d divides "1" with an output value of the subtractor 17c, obtains a complementing value difference, and holds this complementing value difference in the complementing-value difference holding section 17e. For example, when the output value of the subtractor 17c is "4", the complementing-value difference is 0.25.

On the other hand, an output value from the subtractor 17c is input to the counter 17f, and a number of pixels is set at the count value of the counter 17f. For example, when the output value from the subtractor 17c is "4", the count number of the counter 17f becomes "4".

When the semi-transparent rate output section 17g outputs its initial value of "0" to the adder 17h and the semi-transparency processing section 18, the adder 17h adds the output from the semi-transparent rate output section 17g and the complementing-value difference held by the complementing-value difference holding section 17e, and outputs the sum to the semi-transparent rate output section 17g. For example, when the complementing-value difference held by the complementing-value difference holding section 17e is 0.25, this 0.25 is output to the semi-transparent rate output section 17g.

Similarly, when the semi-transparent rate output section 17g has output by the number held by the counter 17f, for example, when the complementing-value difference is 0.25, there are sequentially output from this semi-transparent rate output section 17g values of "0", "0.25", "0.5" and "0.75".

As explained above, the linear complementing processing section 17 indirectly specifies the pixels to be complemented, and, at the same time, calculates from the last position and the position this time a semi-transparent rate that becomes necessary for the semi-transparent processing of each pixel to be complemented, and outputs the calculated semi-transparent rate to the semi-transparency processing section 18.

Figure 4:
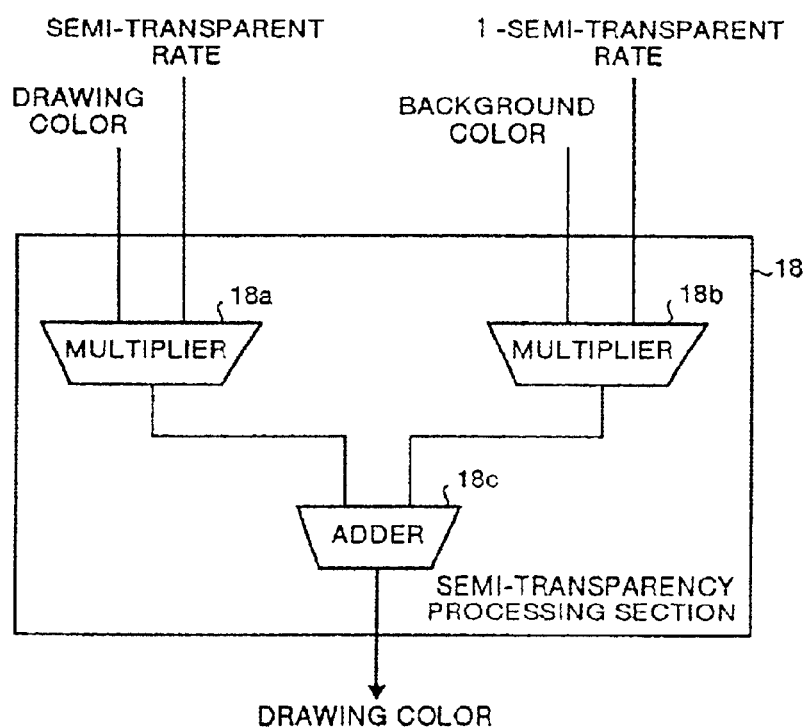
FIG. 4 is an explanatory diagram for showing a concrete example of a structure of a semi-transparency processing section shown in FIG. 2.

A detailed structure of the semi-transparency processing section 18 shown in FIG. 2 is explained below. FIG. 4 is an explanatory diagram for showing one example of a detailed structure of the semi-transparency processing section 18 shown in FIG. 2. As shown in FIG. 4, the semi-transparency processing section 18 consists of two multipliers 18a and 18b and an adder 18c.

The multiplier 18a is a circuit section for multiplying a drawing color of a pixel of a drawing origin obtained from the frame buffer 15 and a semi-transparent rate received from the linear complementing processing section 17. A multiplier 18b is a circuit section for multiplying a background color, that is, a pixel value of a pixel of a drawing destination, and "1—the semi-transparent rate". The adder 18c is a circuit section for adding outputs from the multiplier 18a and the multiplier 18b, and outputting the sum as a pixel value of the pixel at the drawing destination.

For example, when the pixel (C, 1) shown in FIG. 1A is set as a pixel of the drawing destination, the pixel value of the pixel (C, 2), that is the pixel of the drawing origin, becomes a drawing color, and the pixel value of the pixel (C, 1) of the drawing destination becomes a background color. As the semi-transparent rate in this case is 25%, the pixel value of the pixel (C, 1) at the drawing destination becomes as follows:

(C, 2)×0.25+(C, 1)×0.75

Although "1—the semi-transparent rate" is input to the multiplier 18b in this case, there is newly provided, in actual practice, a subtractor for subtracting the output of the linear complementing processing section 17 from "1".

Figure 5:
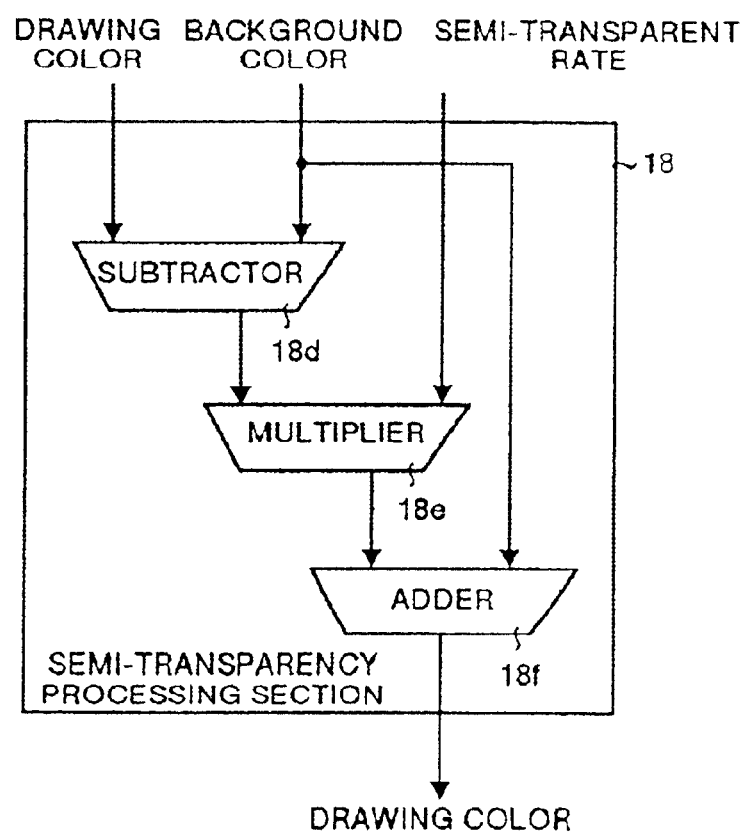
FIG. 5 is an explanatory diagram for showing another example of a structure of the semi-transparency processing section shown in FIG. 2.

FIG. 5 is a diagram for showing another example of a structure of the semi-transparency processing section 18 shown in FIG. 2. As shown in FIG. 5, the semi-transparency processing section 18 consists of a subtractor 18d, a multiplier 18e and an adder 18f.

The subtractor 18d is a circuit section for subtracting a background color that is a pixel value of a pixel at a drawing destination from a drawing color that is a pixel value of a pixel at a drawing origin, thereby to obtain a difference. The multiplier 18e is a circuit section for adding a semi-transparent rate to the difference obtained by the subtractor 18d. The adder 18f is a circuit section for adding the background color to the output of the multiplier 18e.

For example, when the pixel (C, 1) shown in FIG. 1A is set as a pixel of the drawing destination, 0.25 that is a semi-transparent rate is multiplied to a value obtained by subtracting the pixel value of the pixel (C, 1) from the pixel value of the pixel (C, 2). Then, the pixel value of the pixel (C, 1) is added to this result. Therefore, the following calculation result is obtained which is the same as that obtained shown in FIG. 4:

$$\{(C, 2)-(C, 1)\}\times 0.25+(C, 1)=(C, 2)\times 0.25+(C, 1)\times 0.75$$

As explained above, the semi-transparency processing section 18 calculates a pixel value of a pixel to be anti-aliasing processed, by using a drawing color, a background color and a semi-transparent rate as input parameters.

In the series of explanation made above, there has been shown a case where the method of linearly complementing a difference between drawing positions relating to the present invention is structured by a hardware circuit. However, the present invention is not limited to be achieved by hardware but can also be achieved by software.

There will be explained below a case where the method of linearly complementing a difference between drawing positions relating to the present invention is achieved by software. In the following explanation, an anti-aliasing processing is carried out with a delay of one row while carrying out a primary pixel drawing for each row.

Figure 6:
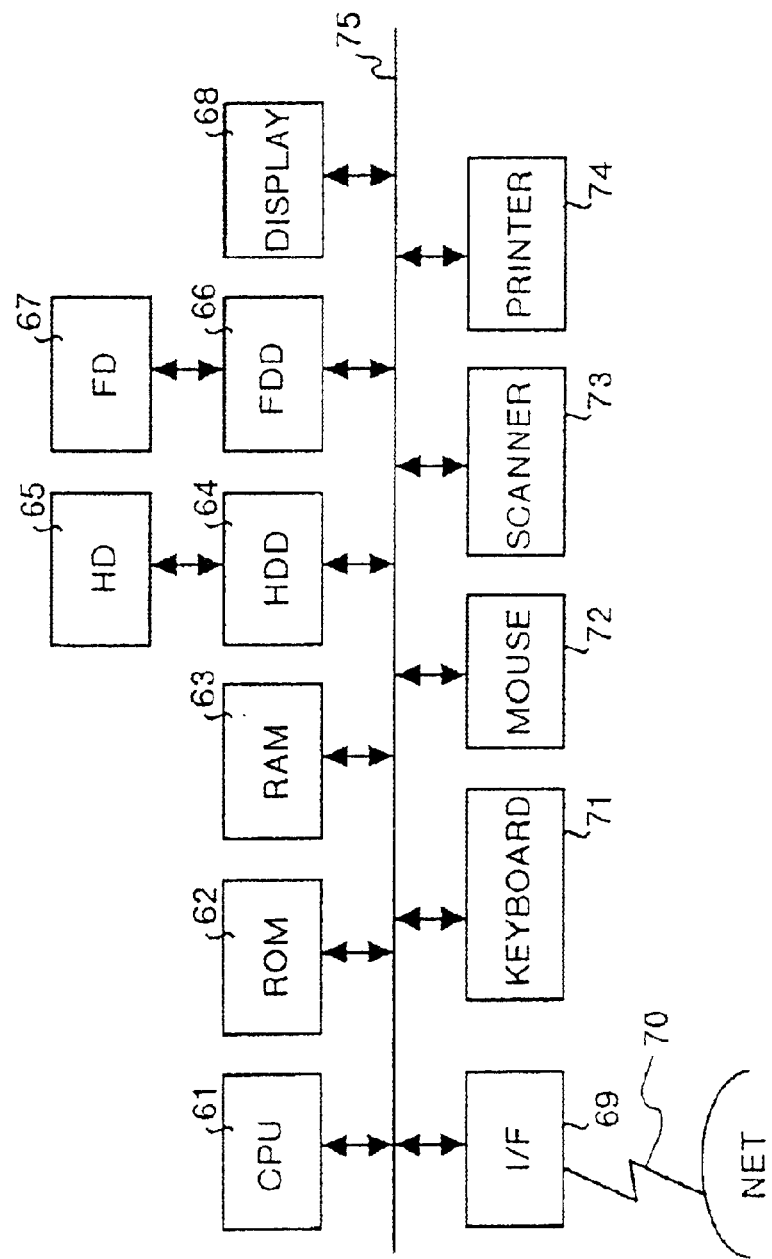
FIG. 6 is a block diagram for showing a hardware structure of an image drawing apparatus in a case where the method of linearly complementing a difference between drawing positions used in the first embodiment is achieved by software.

FIG. 6 is a block diagram for showing a hardware structure of an image drawing apparatus relating to the present invention that achieves the method of linearly complementing a difference between drawing positions. In FIG. 6, a CPU 61 is a central processing unit for controlling the whole of the image drawing apparatus. The CPU 61 executes a program read from a ROM 62, and writes image data in a page memory area (corresponding to the frame buffer 15 in FIG. 2) provided on a RAM 63. In this program, there exists a step relating to the present invention for carrying out a linear complementing processing of a difference between drawing positions.

The ROM 62 is a memory relating to the present invention for storing an image drawing program including a step for carrying out a linear complementing processing of a difference between drawing positions, in addition to an operating system. The RAM 63 is a memory used as a work area for the CPU 61. On the RAM 63, there is secured a page memory area for carrying out an image drawing.

A reference numeral 64 denotes an HDD (a hardware disk drive) for controlling read/write of data from/to an HD (a hard-disk) 65 according to the control of the CPU 61. A reference numeral 65 denotes an HD for storing data written by the control of the HDD 64.

A reference numeral 66 denotes an FDD (a floppy disk drive) for controlling read/write of data from/to an FD (a floppy disk) 67. The FD 67 is shown as one example of a detachable recording medium for storing data written by the control of the FDD 66. A reference numeral 68 denotes a display for displaying a document, an image, functional information, etc.

A reference numeral 69 denotes an interface I/F connected to a network through a communication channel 70, for working as an interface between the network and the inside. A reference numeral 71 denotes a keyboard equipped with keys for inputting characters, numerals, various instructions, etc. A reference numeral 72 denotes a mouse for moving a cursor, selecting a range, pressing icons or buttons displayed on the display screen, moving windows, changing sizes, etc.

A reference numeral 73 denotes a scanner equipped with an OCR (an optical character reader) for optically reading an image. A reference numeral 74 denotes a printer for printing a result of a retrieval or contents of data displayed on the display screen. A reference numeral 75 denotes a bus for connecting the above-described units.

Figure 7:
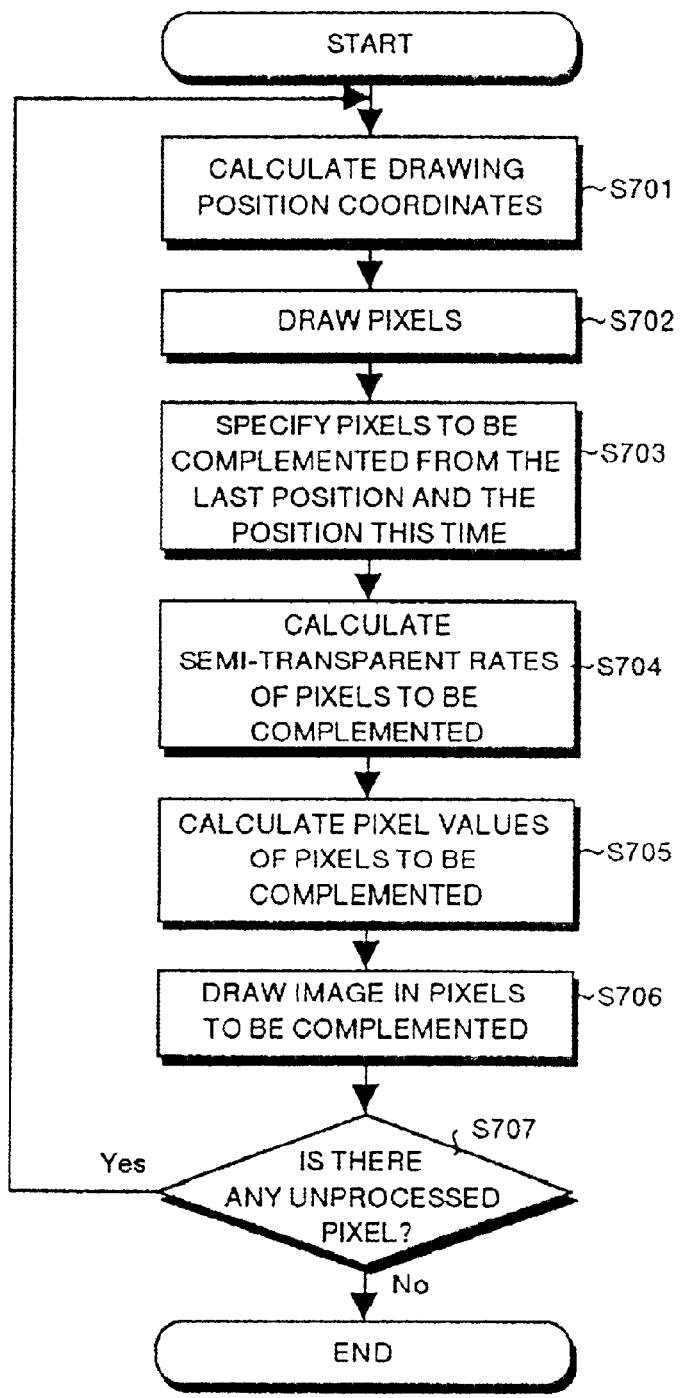
FIG. 7 is a flowchart for showing a step of carrying out a drawing processing by the image drawing apparatus shown in FIG. 6.

A drawing processing step according to the image drawing apparatus shown in FIG. 6 will be explained below. FIG. 7 is a flowchart for showing a sequence of carrying out a drawing processing by the image drawing apparatus shown in FIG. 6. As shown in the flowchart of FIG. 7, the image drawing apparatus at first calculate X coordinates and Y coordinates for showing positional coordinates of pixels into which an image is to be drawn (step S701). Then, the apparatus draws an image into pixels at corresponding positions of a page memory area (step S702), and carries out an anti-aliasing processing by the method of linearly complementing a difference between drawing positions relating to the present invention.

In other words, the image drawing apparatus specifies pixels to be complemented from a last drawing position and a drawing position this time (step S703), and calculates semi-transparent rates of the specified pixels to be complemented (step S704). More specifically, a value of "1" divided by the pixel string to be complemented is set as a difference of complementing value, and this difference of complementing value is added so that the semi-transparent rate increases linearly as the pixel comes closer to the drawing position drawn last time.

After the semi-transparent rates of the respective pixels to be complemented have been obtained, the image drawing apparatus carries out a semi-transparent processing by using the semi-transparent rates between the pixel of a drawing origin and a pixel of a drawing destination, thereby to calculate pixel values of the pixels to be complemented (step S705). The apparatus then writes the pixel values into the pixels to be complemented (step S706). More specifically, a value of the pixel value of the pixel at the drawing origin multiplied by the semi-transparent rate, and a value of the pixel value at the drawing destination multiplied by (1—the semi-transparent rate), are added together, and the sum is used as the pixel value of the pixel to be complemented.

The above-described processing from the step S701 to the step S706 is repeated until there is no unprocessed pixel (Yes in step S707), and, the processing finishes at a point of time when there is no unprocessed pixel (No in step S707).

When the above-described series of processing is carried out, it is possible to achieve, by using software, the anti-aliasing processing based on the method of linearly complementing a difference between drawing positions and the drawing of an image in the page memory area.

As described above, according to the first embodiment, a drawing position last time is stored in advance in the drawing position memory section 16, and the linear complementing processing section 17 specifies pixels to be complemented from the last drawing position stored in the drawing position memory section 16 and a drawing this time, and calculates semi-transparent rates of the pixels specified. Then, the semi-transparency processing section 18 calculates pixel values of the pixels to be complemented, by using the calculated semi-transparent rates. Therefore, the anti-aliasing processing can be carried out at high speed with a minimum memory.

According to the method of linearly complementing a difference between drawing positions explained in the first embodiment above, an semi-transparent rate is calculated by using a difference between the drawing position last time and the drawing position this time. However, it is also possible to calculate a semi-transparent rate without using a difference. Thus, in the second embodiment, there will be explained below a drawing coordinate decimal fraction part utilization method for directly obtaining semi-transparent rate by utilizing the slope of a side of a polygon.

At first, the concept of the method of utilizing drawing-coordinate decimal fraction parts used in the second embodiment will be explained. This method of utilizing drawing-coordinate decimal fraction parts is a method for calculating at high speed semi-transparent rates by utilizing the slope of a side of a polygon, and carrying out an anti-aliasing processing to pixels to be complemented by using the semi-transparent rates calculated, thereby to complement pixel values.

Figure 8B:
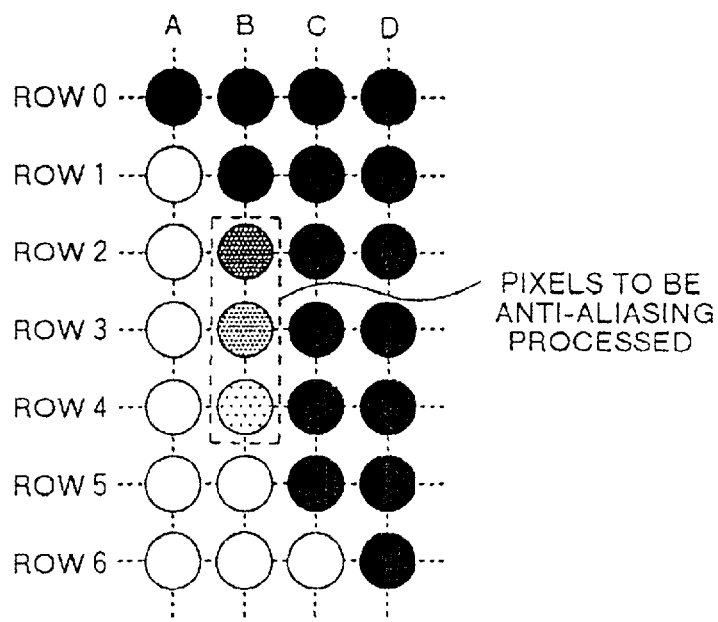
Figure 8B:
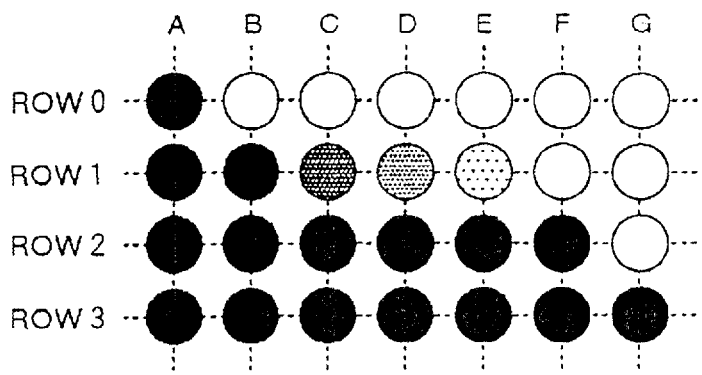

FIG. 8A and FIG. 8B are explain the concept of the method of utilizing drawing-coordinate decimal fraction parts used in the second embodiment. In these figures, reference numerals 0 to 6 denote row numbers, and A to G denote column numbers. It is assumed that pixels shown in black circles in FIG. 8 are pixels forming a part of a polygon.

As shown in FIG. 8A, when the column C is a current drawing position, a pixel (B, 2), (B, 3) or (B, 4) becomes a pixel to be anti-aliasing processed.

In this case, according to this method of utilizing drawing-coordinate decimal fraction parts, a value of a decimal fraction part of a column-direction coordinate calculated from the slope of a side subtracted from 1 is set as semi-transparent rate. The reason why this value is taken as semi-transparent rate will be explained next.

For example, when the slope of a side is y=4x, x becomes equal to 0.25 when y=1.0 (row 1), x becomes equal to 0.5 when y=2.0 (row 2), and x becomes equal to 0.75 when y=3.0 (row 3).

In other words, when the side has a slope of y=4x, the pixel of a first row should be primarily deviated to the column B side by 0.25 from the column A. The pixel of a second row should be deviated to the column B side by 0.5 from the column A, and the pixel of a third row should be deviated to the column B side by 0.75 from the column A.

When the column A and the column B are considered, when there is a large deviation to the column B side, the pixels of the column B can absorb this deviation. Therefore, in this case, it is not necessary to set a semi-transparent rate at a very large rate. However, when there is a large deviation to the column A side, the pixels of the column B cannot absorb this deviation. In this case, it is necessary to set a semi-transparent rate at a large rate.

The above applies to the relationship between the column B and the column C, and between the column C and the column D, and not only between the column A and the column B. Therefore, according to the drawing-coordinate decimal fraction utilization method used in the second embodiment, the value of the decimal fraction part of the column-direction coordinate calculated from the slope of the side, subtracted from 1 is set as the semi-transparent rate.

After the semi-transparent rates of the pixels (B, 2) to (B, 4) to be anti-aliasing processed have been obtained in this way, a semi-transparent processing is carried out by using pixels (C, 2) to (C, 4) as the pixels of the drawing origin, and by using pixels (B, 2) to (B, 4) as the pixels of the drawing destination, in a similar manner to that described in the first embodiment. The result of the processing is stored in the pixels (B, 2) to (B, 4). When the slope of the side of the polygon exceeds 45 degrees, as shown in FIG. 8B, the decimal fraction part of the row coordinate is used instead of the decimal fraction part of the column coordinate.

Figure 9:
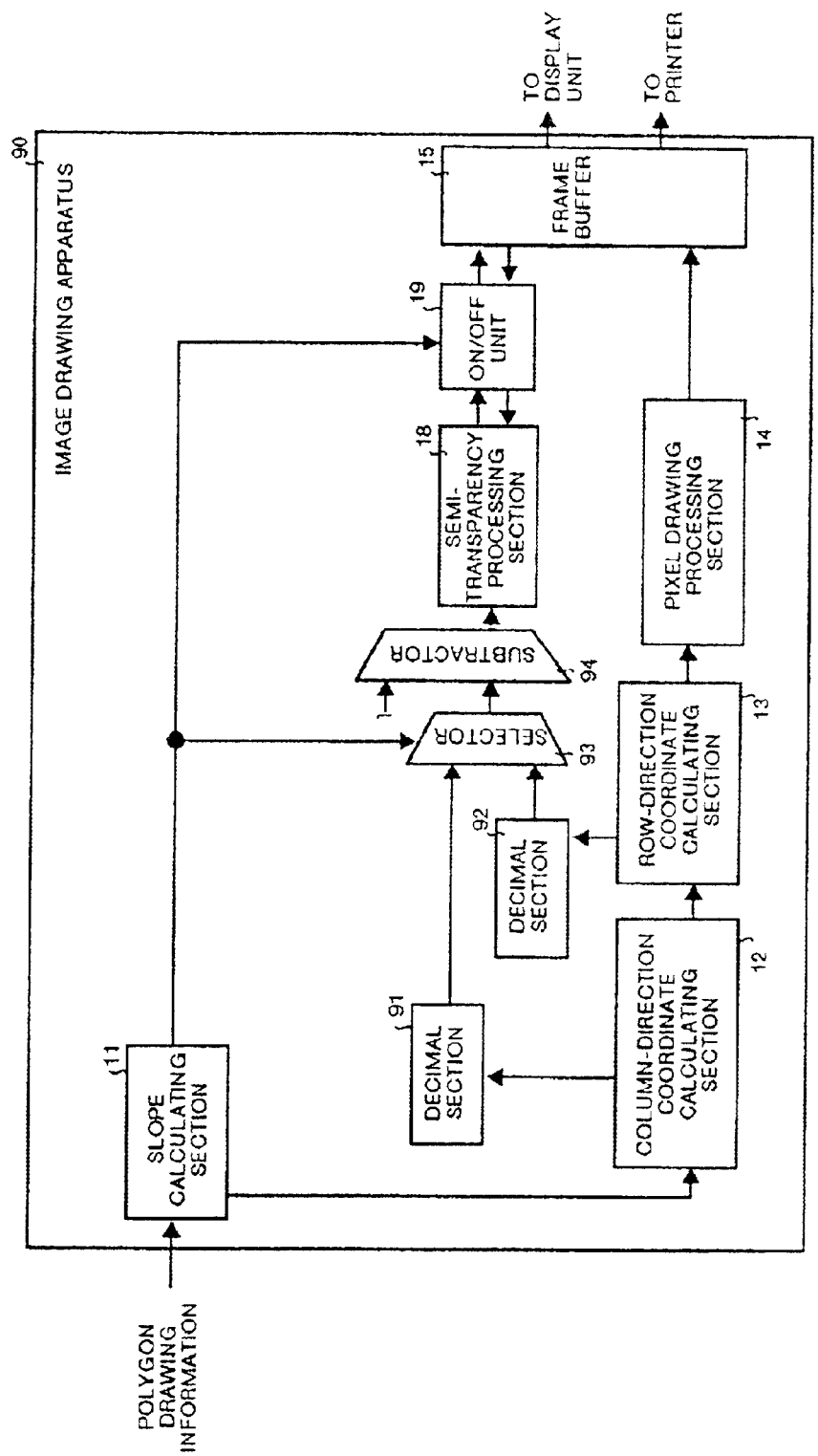
FIG. 9 is a block diagram for showing a structure of an image drawing apparatus using the method of utilizing drawing-coordinate decimal fraction parts in the second embodiment.

A structure of the image drawing apparatus using the method of utilizing drawing-coordinate decimal fraction parts relating to the second embodiment will be explained next. FIG. 9 is a block diagram for showing a structure of an image drawing apparatus using the method of utilizing drawing-coordinate decimal fraction parts in the second embodiment. Portions having similar functions to those in the image drawing apparatus shown in FIG. 2 are attached with identical reference numerals, and their detailed explanation will be omitted.

In FIG. 9, an image drawing apparatus 90 has a slope calculating section 11, a column-direction coordinate calculating section 12, a row-direction coordinate calculating section 13, a pixel drawing processing section 14, a frame buffer 15, a semi-transparency processing section 18, an ON/OFF unit 19, decimal sections 91 and 92, and a subtractor 94.

The decimal section 91 is a processing section for extracting only a decimal fraction part of the column-direction coordinate calculated by the column-direction coordinate calculating section 12, and the decimal section 92 is a processing section for extracting only a decimal fraction part of the row-direction coordinate calculated by the row-direction coordinate calculating section 13, The selector 93 is a processing section for selecting whether the column coordinate is to be used or the row coordinate is to be used depending on whether the slope angle calculated by the slope calculating section 11 is less than 45 degrees or the slope angle exceeds 45 degrees. More specifically, when the slope angle is less than 45 degrees, the selector 93 selects an output of the decimal section 91, and when the slope angle exceeds 45 degrees, the selector 93 selects an output of the decimal section 92.

The subtractor 94 is a processing section for subtracting the output of the selector 93 from 1. This subtraction is carried out for the purpose of outputting to the semi-transparency processing section 18 a value of the decimal fraction that is an output of the selector 93, subtracted from 1, as a semi-transparent rate.

When the image drawing apparatus 90 having the above-described structure is used, it becomes possible to draw an image in the frame buffer 15 while carrying out an anti-aliasing processing using the drawing-coordinate decimal fraction utilization method.

There will be explained below a case where the drawing-coordinate decimal fraction utilization method relating to the second embodiment is achieved by software. The structure of the image drawing apparatus used in this case is similar to that shown in FIG. 6, and therefore, only the step of processing the method will be explained below.

Figure 10:
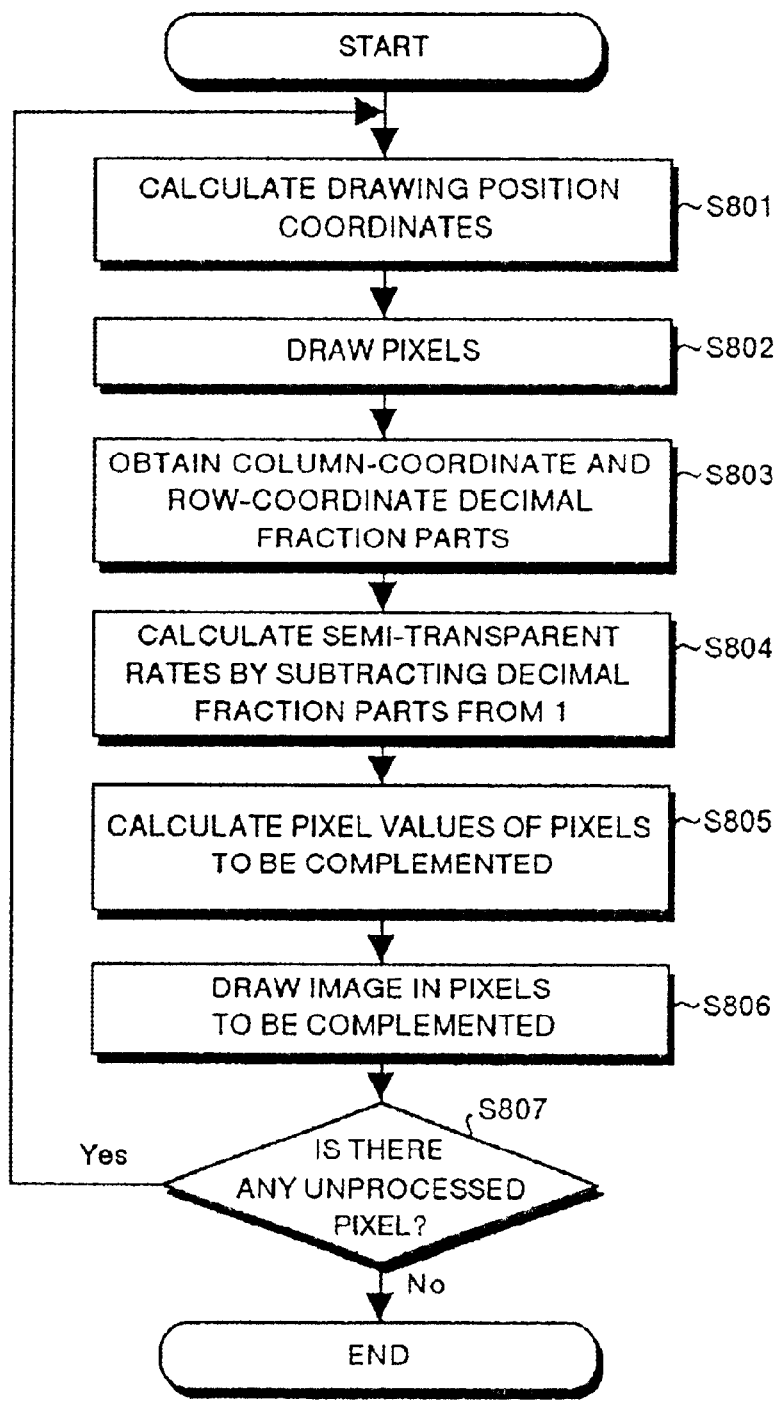
FIG. 10 is a flowchart for showing a step of carrying out a processing of the case that the method of utilizing drawing-coordinate decimal fraction parts relating to the second embodiment is achieved by software.

FIG. 10 is a flowchart for showing a sequence of carrying out a processing of the case that the method of utilizing drawing-coordinate decimal fraction parts relating to the second embodiment is achieved by software. As shown in FIG. 10, at first, X coordinates and Y coordinates for showing positional coordinates of pixels into which an image is to be drawn are calculated (step S801). Then, an image is drawn into pixels at corresponding positions of a page memory area (step S802), and an anti-aliasing processing is carried out by the method of utilizing drawing-coordinate decimal fraction parts relating to the present invention.

Specifically, decimal fraction parts of the column coordinate and the row coordinate are obtained respectively (step S803), and one of the decimal fraction parts obtained based on the slope of the side is selected. Then, a semi-transparent rate is calculated by subtracting the selected decimal fraction part from "1" (step S804).

After the semi-transparent rates of the pixels to be complemented have been obtained, a semi-transparent processing is carried out by using a semi-transparent rate between the pixel of the drawing origin and the pixel of the drawing destination, and a pixel value of each pixel to be complemented is calculated (step S805). The calculated pixel value is written in the corresponding pixel to be complemented (step S806). More specifically, a value of the pixel value of the pixel at the drawing origin multiplied by the semi-transparent rate, and a value of the pixel value at the drawing destination multiplied by (1—the semi-transparent rate), are added together, and the sum is used as the pixel value of the pixel to be complemented.

The above-described processing from the step S801 to the step S806 is repeated until there is no unprocessed pixel (Yes in step S807), and, the processing finishes at a point of time when there is no unprocessed pixel (No in step S807).

When the above-described series of processing is carried out, it is possible to achieve, by using software, the anti-aliasing processing based on the method of utilizing drawing-coordinate decimal fraction parts and the drawing of an image in the page memory area.

As described above, according to the second embodiment, the decimal fraction parts of the column coordinate and the row coordinate are obtained by the decimal sections 91 and 92 respectively. One of the decimal fraction parts obtained by the selector 93 according to the slope angle is selected, and a value of the selected decimal fraction part, subtracted from 1 is set as a semi-transparent rate. Then, the semi-transparency processing section 18 calculates a pixel value of each pixel to be complemented, by using the semi-transparent rate. Therefore, it becomes possible to carry out the anti-aliasing processing at high speed.

In the above-described the first embodiment and the second embodiment, the method of linearly complementing a difference between drawing positions and the method of utilizing drawing-coordinate decimal fraction parts are applied respectively for the case where the slope angle calculated by the slope calculating section 11 exceeds 45 degrees as well as the case where the slope angle is less than 45 degrees. However, it is also possible to carry out an anti-aliasing processing by using a combination of these two methods. Thus, in the third embodiment, there will be explained below a combined method of the above-described method of linearly complementing a difference between drawing positions and the method of utilizing drawing-coordinate decimal fraction parts.

In the image drawing apparatus, generally a dynamic ROM is used in many cases in the frame buffer 15 as the image storing area. This is because the dynamic ROM can most efficiently execute the processing in a continuous area. Therefore, by taking into consideration a high-speed processing in the continuous area, a polygon is normally divided into row units, and a drawing is carried out for each row.

The method of linearly complementing a difference between drawing positions as explained in the first embodiment can cope with a row-unit division when the slope angle is less than 45 degrees. However, when the slope angle exceeds 45 degrees, it is difficult to cope with the processing as the semi-transparent rate changes into a column direction.

On the other hand, the method of utilizing drawing-coordinate decimal fraction parts as explained in the second embodiment can cope with a row-unit division when the slope angle exceeds 45 degrees. However, when the slope angle is less than 45 degrees, it is necessary to calculate a column-direction coordinate that is not primarily required for the row-unit drawing.

Therefore, in the combined method relating to the third embodiment, the method of linearly complementing a difference between drawing positions is utilized when the slope angle is less than 45 degrees, and the method of utilizing drawing-coordinate decimal fraction parts is utilized when the slope angle exceeds 45 degrees.

Figure 11:
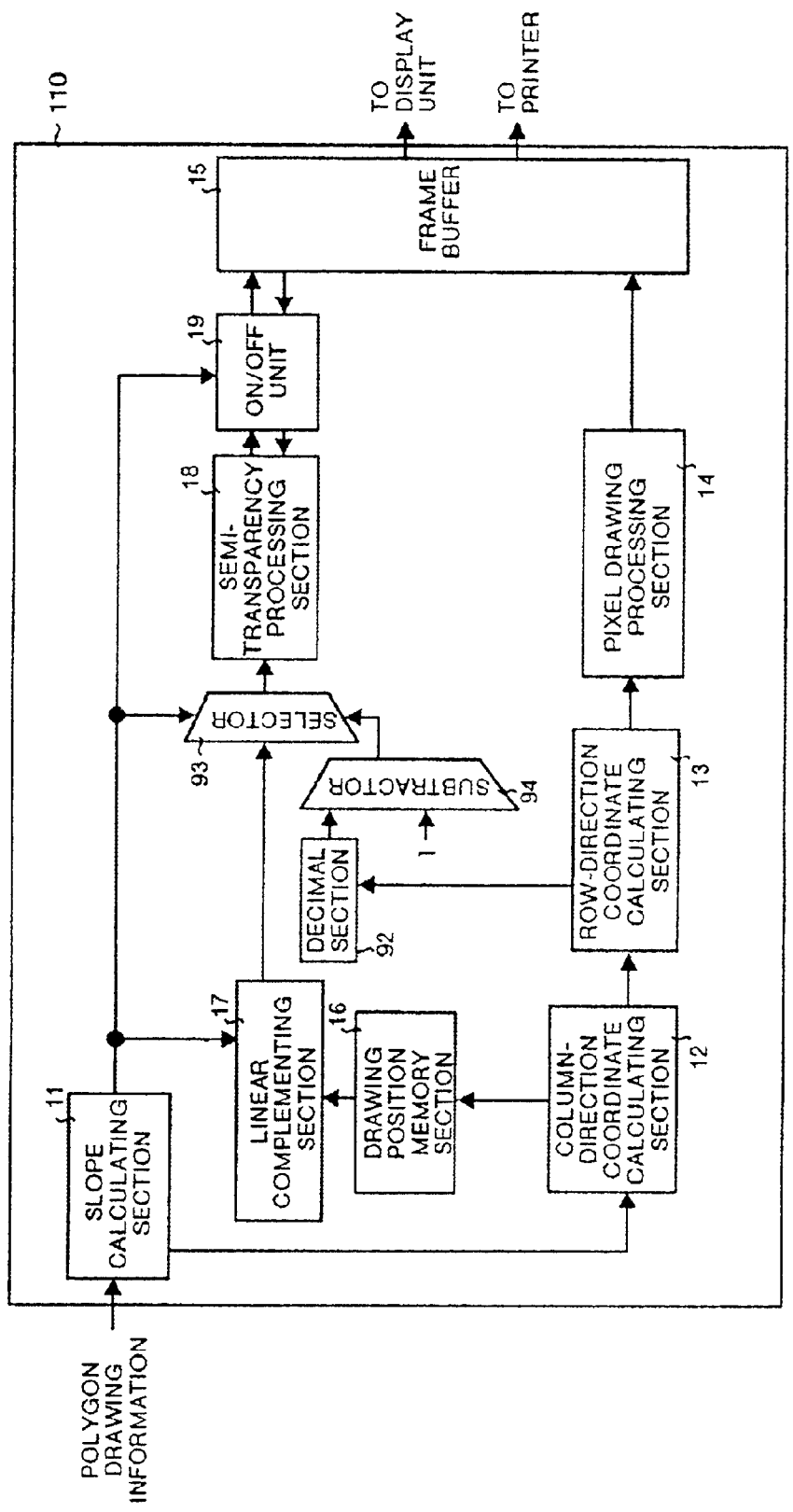
FIG. 11 is a block diagram for showing a structure of an image drawing apparatus using a combined method relating to the third embodiment.

There will be explained below a structure of an image drawing apparatus using the combined method relating to the third embodiment. FIG. 11 is a block diagram for showing a structure of the image drawing apparatus using the combined method relating to the third embodiment.

In FIG. 11, an image drawing apparatus 110 has a slope calculating section 11, a column-direction coordinate calculating section 12, a row-direction coordinate calculating section 13, a pixel drawing processing section 14, a frame buffer 15, a drawing position memory section 16, a linear complementing processing section 17, a semi-transparency processing section 18, an ON/OFF unit 19, a decimal section 92, a selector 93, and a subtractor 94.

When a slope calculated by the slope calculating section 11 is less than 45 degrees, this image drawing apparatus 110 carries out an anti-aliasing processing of the method of linearly complementing a difference between drawing positions by using a last column coordinate position stored in the drawing position memory section 16 and a column coordinate position this time. In other words, the linear complementing processing section 17 calculates a semi-transparent rate by using the last position and the position this time, and the semi-transparency processing section 18 carries out a semi-transparent processing.

On the other hand, when the slope calculated by the slope calculating section 11 exceeds 45 degrees, the decimal section 92 obtains a decimal fraction of the row-direction coordinate, and the subtractor 94 subtracts the obtained decimal fraction part from 1 to calculate a semi-transparent rate, and the semi-transparency processing section 18 carries out a semi-transparent processing by using the calculated semi-transparent rate.

As explained above, according to the third embodiment, when a slope calculated by the slope calculating section 11 is less than 45 degrees, the image drawing apparatus 110 carries out an anti-aliasing processing of the method of linearly complementing a difference between drawing positions, and when the slope calculated by the slope calculating section 11 exceeds 45 degrees, the processing is carried out based on the method of utilizing drawing-coordinate decimal fraction parts. Therefore, it is possible to carry out an anti-aliasing processing by taking the advantages of both methods.

As explained above, according to the present invention, in storing image information of pixels forming a part of a polygon in an image memory, a pixel string of which aliasing is to be complemented is specified, based on a difference between pixel positions of the pixels and pixel positions of pixels stored last time in the image memory, a semi-transparent rate of each pixel forming the pixel string is calculated, based on the number of pixels of the specified pixel string, and a semi-transparent processing of the pixel string to be complemented is carried out, based on the calculated semi-transparent rate. Therefore, at the time of drawing the polygon in the image memory, it is possible to carry out an anti-aliasing processing at high speed without requiring a work memory area other than the drawing memory.

Further, according to the present invention, a slope of a side of a polygon is calculated, and, when the calculated slope exceeds 45 degrees, a pixel string to be complemented is specified by replacing a pixel position in a column direction with a pixel position in a row direction. Therefore, it is possible to efficiently carry out an anti-aliasing processing in any case of when the slope is less than 45 degrees or when the slope exceeds 45 degrees.

Further, according to the present invention, a number of pixels existing between a pixel position of a first pixel stored last time in the image memory and a pixel position of a second pixel currently stored in the image memory is calculated, and the pixel string of the corresponding number of pixels adjacent to the first pixel is set as a pixel string to be complemented. Therefore, it is possible to efficiently specify a pixel string to be complemented.

Further, according to the present invention, a semi-transparent rate of each pixel forming a specified pixel string is increased linearly. Therefore, it is possible to promptly allocate a semi-transparent rate to a pixel forming the pixel string to be complemented.

Further, according to the present invention, a reference value (a complement value difference) of a semi-transparent rate is calculated based on the number of pixels of a specified pixel string, this reference value is added in circulation and this added value is used as a semi-transparent rate of each pixel forming the pixel string. Therefore, it is possible to calculate a semi-transparent rate easily by using a circulating circuit.

Further, according to the present invention, a slope of a side of a polygon is calculated, the semi-transparent rate of a pixel is calculated based on a coordinate position of the pixel to be complemented calculated from the calculated slope, and a semi-transparent processing is carried out for the pixel to be complemented, based on the calculated semi-transparent rate. Therefore, it is possible to carry out a semi-transparent processing at high speed, by only an extremely simple calculation using a decimal fraction part of the coordinates.

Further, according to the present invention, when a calculated slope is less than 45 degrees, a semi-transparent rate is calculated based on a decimal fraction part of a pixel position in a column direction, and when a calculated slope exceeds 45 degrees, a semi-transparent rate is calculated based on a decimal fraction part of a pixel position in a row direction. Therefore, it is possible to efficiently carry out an anti-aliasing processing in any case of when the slope is less than 45 degrees or when the slope exceeds 45 degrees.

Further, according to the present invention, a value obtained by subtracting from 1, a decimal fraction part of a coordinate position of a pixel to be complemented calculated from the calculated slope, is used as a semi-transparent rate. Therefore, it is possible to calculate at high speed a semi-transparent rate by a mere calculation of a subtraction.

Further, according to the present invention, decimal fraction parts at the column-direction and row-direction coordinate positions of the pixels to be complemented respectively are extracted, any one decimal fraction part extracted based on a calculated slope is selected, and the selected decimal fraction part is subtracted from 1. Therefore, it is possible to calculate a semi-transparent rate by an extremely simple calculation of subtracting any one of row and column decimal fraction parts from 1.

Further, according to the present invention, a slope of a side of a polygon is calculated; in storing image information of pixels forming a part of a polygon in an image memory, a pixel string of which aliasing is to be complemented is specified, based on a difference between pixel positions of the pixels and pixel positions of pixels stored last time in the image memory, and a semi-transparent rate of each pixel forming the pixel string is calculated, based on the number of pixels of the specified pixel string; or the semi-transparent rate of a pixel is calculated based on a coordinate position of the pixel to be complemented from the calculated slope; and thus a semi-transparent rate is obtained; and a semi-transparent processing is carried out for each pixel to be complemented, based on the semi-transparent rate obtained by any one of the above unit. Therefore, it is possible to efficiently carry out an anti-aliasing processing by using a suitable one of the two unit for calculating a semi-transparent rate.

Further, according to the present invention, when a calculated slope is less than 45 degrees, the former semi-transparent rate calculating unit is used to calculate a semi-transparent rate, and when the slope exceeds 45 degrees, the latter semi-transparent rate calculating unit is used to calculate a semi-transparent rate. Therefore, it is possible to calculate a semi-transparent rate by using a suitable one of the semi-transparent rate calculating unit based on whether the slope of a side is less than 45 degrees or the slope exceeds 45 degrees.

Further, according to the present invention, a value obtained by multiplying image information of a pixel forming a polygon with the semi-transparent rate and a value obtained by multiplying a value after having the semi-transparent rate subtracted from 1 (1—the semi-transparent rate) with image information of a pixel forming a background other than the polygon, are added together, and this added value is used as image information of each pixel forming the pixel string. Therefore, it is possible to efficiently carry out a semi-transparent processing by simple calculation.

Further, according to the present invention, when a calculated slope is not 45 degrees, a semi-transparent processing becomes possible, and when the slope is 45 degrees, a semi-transparent processing is not possible. Therefore, it is possible to avoid a processing when an aliasing is not generated, so that the speed of processing can be increased further.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image drawing apparatus for complementing an aliasing with an intermediate color, said image drawing apparatus comprising:

a calculating unit for calculating a slope of a side of a polygon;

a specifying unit for specifying a pixel string of the aliasing to be complemented, based on a difference between pixel positions of pixels forming a part of the polygon and pixel positions of pixels which have been stored previously in an image memory, at the time of storing image information of the pixels forming a part of the polygon in the image memory;

a first semi-transparent rate calculating unit for calculating a semi-transparent rate of each pixel forming the pixel string, based on the number of pixels of the pixel string specified by the specifying unit;

a second semi-transparent rate calculating unit for performing a predetermined calculation for a value of a decimal fraction part of a column-direction or a row-direction calculated from the calculated slope to generate a second semi-transparent rate of a pixel; and a processing unit for carrying out a semi-transparent processing of each pixel to be complemented, based on the semi-transparent rate or the second semi-transparent rate.

2. An image drawing method for complementing an aliasing with an intermediate color, said image drawing method comprising:

calculating a slope of a side of a polygon;

calculating a semi-transparent rate, such that when the calculated slope is less than 45 degrees, in storing image information of pixels forming a part of the polygon in an image memory, for specifying a pixel string of which aliasing is to be complemented, based on a difference between pixel positions of the pixels and pixel positions of pixels stored a previous time in the image memory, and calculating a semi-transparent rate of each pixel forming the pixel string, based on a number of pixels of the specified pixel string, and when the calculated slope exceeds 45 degrees, for performing a predetermined calculation for a value of a decimal fraction part of a column-direction or a row-direction calculated from the calculated slope to generate the semi-transparent rate of a pixel; and carrying out a semi-transparent processing on each pixel to be complemented, based on the semi-transparent rate.

3. A computer-readable recording medium recorded with a program controlling a computer to execute an image drawing method for complementing an aliasing with an intermediate color, said program controlling the computer to:

calculate a slope of a side of a polygon;

perform a semi-transparent calculation, such that, when the calculated slope is less than 45 degrees, in storing image information of pixels forming a part of the polygon in an image memory, specifying a pixel string of which aliasing is to be complemented, based on a difference between pixel positions of the pixels and pixel positions of pixels stored a previous time in the image memory, and calculating a semi-transparent rate of each pixel forming the pixel string, based on a number of pixels of the specified pixel string, and when the calculated slope exceeds 45 degrees, performing a predetermined calculation for a value of a decimal fraction part of a column-direction or a row-direction calculated from the calculated slope to generate a semi-transparent rate of a pixel; and carry out a semi-transparent processing on each pixel to be complemented, based on the calculated semi-transparent rate.

4. An image drawing apparatus for complementing an aliasing with an intermediate color, said image drawing apparatus comprising:

a calculating unit for calculating a slope of a side of a polygon;

a semi-transparent rate calculating unit for performing a predetermined calculation for a value of a decimal fraction part of a column-direction or a row-direction calculated from the calculated slope to generate a semi-transparent rate of a pixel; and a processing unit for carrying out a semi-transparent processing of the pixel to be complemented, based on the semi-transparent rate calculated by said semi-transparent rate calculating unit, wherein the predetermined calculation includes subtracting the value of the decimal fraction part of the column-direction or the value of the decimal fraction part of the row-direction, calculated from the calculated slope, from 1.

5. An image drawing method for complementing an aliasing with an intermediate color, said image drawing method comprising:

calculating a slope of a side of a polygon;

performing a predetermined semi-transparent rate calculation for a value of a decimal fraction part of a column-direction or a row-direction calculated from the calculated slope to generate a semi-transparent rate of a pixel; and carrying out a semi-transparent processing of the pixel to be complemented, based on the semi-transparent rate, wherein the predetermined calculation includes subtracting the value of the decimal fraction part of the column-direction or the value of the decimal fraction part of the row-direction, calculated from the calculated slope, from 1.

6. A computer-readable recording medium recorded with a program controlling a computer to execute an image drawing method for complementing an aliasing with an intermediate color, said program controlling the computer to:

calculate a slope of a side of a polygon;

perform a predetermined semi-transparent rate calculation for a value of a decimal fraction part of a column-direction or a row-direction calculated from the slope to generate a semi-transparent rate of a pixel; and carry out a semi-transparent processing of the pixel to be complemented, based on the calculated semi-transparent rate, wherein the predetermined calculation includes subtracting the value of the decimal fraction part of the column-direction or the value of the decimal fraction part of the row-direction, calculated from the calculated slope, from 1.

* * * * *

UNITED STATES PATENT AND TRADEMARK OFFICE
CERTIFICATE OF CORRECTION

PATENT NO. : 6,882,444 B1
DATED : April 19, 2005
INVENTOR(S) : Hidefumi Nishi

It is certified that error appears in the above-identified patent and that said Letters Patent is hereby corrected as shown below:

Title page,
Item [56], References Cited, FOREIGN PATENT DOCUMENTS, add:
-- JP    2000-099748    4/2000
   JP    06-301788    10/1994 --.

Signed and Sealed this

Twenty-fourth Day of January, 2006

JON W. DUDAS
*Director of the United States Patent and Trademark Office*